United States Patent [19]
Koch

[11] Patent Number: 5,675,849
[45] Date of Patent: Oct. 14, 1997

[54] DRIVE FOR ADJUSTABLE PARTS OF RECLINERS OR BEDS

[76] Inventor: Dietmar Koch, Zur Merhardt 9, 51645 Gummersbach, Germany

[21] Appl. No.: 601,308

[22] Filed: Feb. 16, 1996

[30] Foreign Application Priority Data

Feb. 17, 1995 [DE] Germany .............. 295 02 658 U

[51] Int. Cl.⁶ ............................................. A47B 7/02
[52] U.S. Cl. ................................ 5/616; 5/618; 227/180
[58] Field of Search .......................... 5/600, 616–619; 227/180, 184, 189, 178

[56] References Cited

U.S. PATENT DOCUMENTS

| 3,129,607 | 4/1964 | Schaefer | 5/616 |
|---|---|---|---|
| 3,300,794 | 1/1967 | Altorfer | 5/616 |
| 4,120,057 | 10/1978 | Neumann | 5/616 |
| 5,063,623 | 11/1991 | Bathrick | 5/616 |

FOREIGN PATENT DOCUMENTS

| 880 60 94.2 | 8/1988 | Germany . |
|---|---|---|
| 3735370C2 | 2/1989 | Germany . |
| 921 08 01.6 | 12/1992 | Germany . |
| 921 26 00.6 | 1/1993 | Germany . |
| 4136373A1 | 5/1993 | Germany . |
| 940 56 31.5 | 8/1994 | Germany . |

*Primary Examiner*—Flemming Saether
*Attorney, Agent, or Firm*—Fildes & Outland, P.C.

[57] ABSTRACT

The invention relates to a drive for adjustable parts of recliners or beds, comprising a multi-part housing, at least partly sealed off against the outside, in which electrical drive components, such as an electric motor, and mechanical drive components, such as a linkage, are located, where at least all the electrical drive components are located in the sealed section of the housing and in which the mechanically movable components leading out of the sealed housing section are sealed off against the wall of the housing section by means of a seal. The purpose of the invention is to create a drive for adjustable parts of recliners or beds which offers sufficient safety when used in damp or wet environments. The invention is characterized in that the seal (19) is of one-piece design and includes a first sealing element (20) for sealing the housing, and a second sealing element (21) for sealing the feed-through (18), where the first sealing element (20) is designed as a toroidal sealing ring and the two sealing elements (20; 21) essentially lie in one plane when not assembled, and that the second sealing element (21) can be rotated in relation to this plane.

10 Claims, 3 Drawing Sheets

DRIVE FOR ADJUSTABLE PARTS OF RECLINERS OR BEDS

FIELD OF THE INVENTION

The invention relates to a drive for adjustable parts of recliners or beds. The drive comprises a multi-part housing, at least partly sealed off against the outside, in which electrical drive components, such as an electric motor, and mechanical drive components, such as a linkage, are located; all the electrical drive components are located in the sealed section of the housing and the mechanically movable components leading out of the sealed housing section are sealed off against the wall of the housing section by means of a seal.

BACKGROUND OF THE INVENTION

A drive of the aforementioned type is known from DE 41 36 373 C2. This drive has a housing containing a spindle-and-nut mechanism which acts on an adjusting lever. This adjusting lever is connected to an adjustable part of a recliner or bed. The exertion of pressure on the adjusting lever allows the latter to raise or lower the adjustable part of the bed or recliner.

The drive units are exposed to liquids and moisture, particularly when used in the medical and nursing sector. In this environment liquids or moisture may penetrate the housing, thus triggering malfunctions which may impair operation or safety. For example, corrosion phenomena may arise, or faulty electrical connections or short-circuits may occur.

DE 37 35 370 C2 describes an adjusting device for use on hospital beds or the like. Therein is described an electric motor, a lifting rod driven by it and the associated electric circuit elements located in a multi-part housing. The housing is essentially designed as a cylindrical section of tubing, each end of which is sealed off by a cover. The lifting rod passes through one of the covers and is sealed off against the feed-through in the cover by an annular seal designed as an O-ring. The adjusting device is intended to be sealed off against contamination and the like in this way. However, the disadvantage in this context is the poor accessibility of the drive elements and the limited efficiency of the seal.

The object of the invention is to create a drive for adjustable parts of recliners or beds which offers sufficient safety when used in damp or wet environments.

SUMMARY OF THE INVENTION

In accordance with the invention, a drive comprising a multi-part housing for adjustable parts of recliners or beds includes a one-piece seal comprising a first sealing element for the housing seal and a second sealing element for the feed-through. The first sealing element is designed as a toroidal sealing ring and both sealing elements lie essentially in one plane when not fitted. The second sealing element is rotatable in relation to this plane.

A seal of this kind has a very favourable design from the manufacturing point of view, as it can be produced in a simple mould. The use of slides in the mould, which considerably increases the cost of mould adjustment, is thus avoided.

When inserting the seal, the second sealing element is rotated out of the common plane. As the first sealing element is designed in the form of a toroidal sealing ring, this can be done without causing external deformation of the seal.

Selection of a sealed housing section ensures that the drive components located therein are protected against liquids and moisture, particularly against splashes of water. Particularly when using this arrangement in the medical and nursing sector, this results in a high safety standard for patients and great functional reliability, as moisture can no longer trigger effects which would impair correct functioning of the drive.

One favourable configuration of the invention provides for the housing to be split into two sections, with a seal being inserted between the two halves of the housing.

The split housing is always easier to manufacture, and a housing of this kind can be fitted with components and assembled more simply. Sealing the two halves of the housing achieves a fully functional seal against moisture and liquids.

A further configuration of the invention provides for the feed-through, which allows the mechanically moved parts to penetrate the housing wall, to lie in the parting line between the two halves of the housing.

This offers the particular advantage that the feed-through is not closed in itself. Instead, the two halves of the housing only create the feed-through when assembled, this considerably facilitating the assembly of the mechanically moved drive components.

It is particularly expedient to design the second sealing element as a lip seal.

This design can also be achieved in a single moulding operation using a simple mould, the lip seal representing a particularly soft seal with very good sealing properties.

An advanced development provides for the housing to have an integral seal retainer, into which the seal is fitted by a positive, non-positive or material connection.

A seal retainer of this kind substantially facilitates assembly of the arrangement according to the invention, as the seal essentially only needs to be inserted and is thus already mechanically fixed. Furthermore, the sealing function is also generally improved, because the seal cannot yield laterally.

A particularly favourable configuration of the invention is characterised by the fact that the housing has one sealed section and one open section. The housing is provided with mounts for the axle of a means of adjustment taking the form of an elbow lever, one lever arm of which has a working connection to the drive, while the other lever arm has a working connection to the adjustable part of the recliner or bed. A sliding piece, which can be moved in a linear direction by a spindle-and-nut mechanism, acts on the drive-side lever arm. The sliding piece can be moved through the feed-through. A seal is located between the sliding piece and the feed-through. In this context, the spindle-and-nut mechanism is driven by an electric motor, and all mechanical and electrical means for moving the sliding piece are located in the sealed housing section.

The basic design permits a highly favourable structural shape which, particularly as a result of the long form dictated by the linear drives, can be arranged very well under a bed or recliner. As the mechanically moved drive component, only the sliding piece needs to be sealed off against the feed-through, meaning that a good sealing effect can be achieved.

One possibility is for the sliding piece to be guided in a sleeve.

This makes it possible to transmit very high forces, as the sliding piece cannot yield laterally and buckling effects can thus be avoided. Conversely, this arrangement permits savings on material and a corresponding reduction in weight, as the necessary mechanical stability can be achieved by means of the sleeve.

When incorporating a sleeve to guide the sliding piece, it is expedient to fit the sleeve with two position switches which can be actuated by the sliding piece.

These position switches are very easy to install, as their assembly position is precisely defined. At the same time, the switches are located in an area affording mechanical protection and protection against moisture, this increasing their operating reliability. The incorporation of position switches in the manner described represents a very inexpensive way of controlling the stroke length of a linear drive.

An advanced development of the above configuration provides for the position switches to be located on the outside of the sleeve, with the parts which trigger the switching functions protruding into the inside of the sleeve through openings and being actuated by the sliding piece.

Said openings are located at precisely determined positions in the sleeve, this making it considerably easier for an assembly worker to install the position switches correctly. This again increases functional reliability by avoiding assembly errors.

Finally, it is highly expedient to design the arrangement in such a way that the open housing section has downward-pointing drainage openings.

A configuration of this kind ensures that the section containing the mechanically moved drive components can be protected without having to provide special seals for this purpose.

The invention is described in more detail below on the basis of a practical example.

BRIEF DESCRIPTION OF THE DRAWINGS

FIG. 3: An enlarged cross-sectional representation of the seal in the area of the housing seal and in the area of the seal for the feed-through.

DETAILED DESCRIPTION OF THE DRAWINGS

Drive 1 in accordance with the invention, illustrated in the figures, serves to adjust slatted bed bases, such as intended for use as bases in recliners or beds. Drive 1 essentially consists of housing 2, which accommodates a servomotor (not shown) with mechanism 3 and adjusting device 4 for adjusting the moving parts of the slatted bed base.

Figure 1:
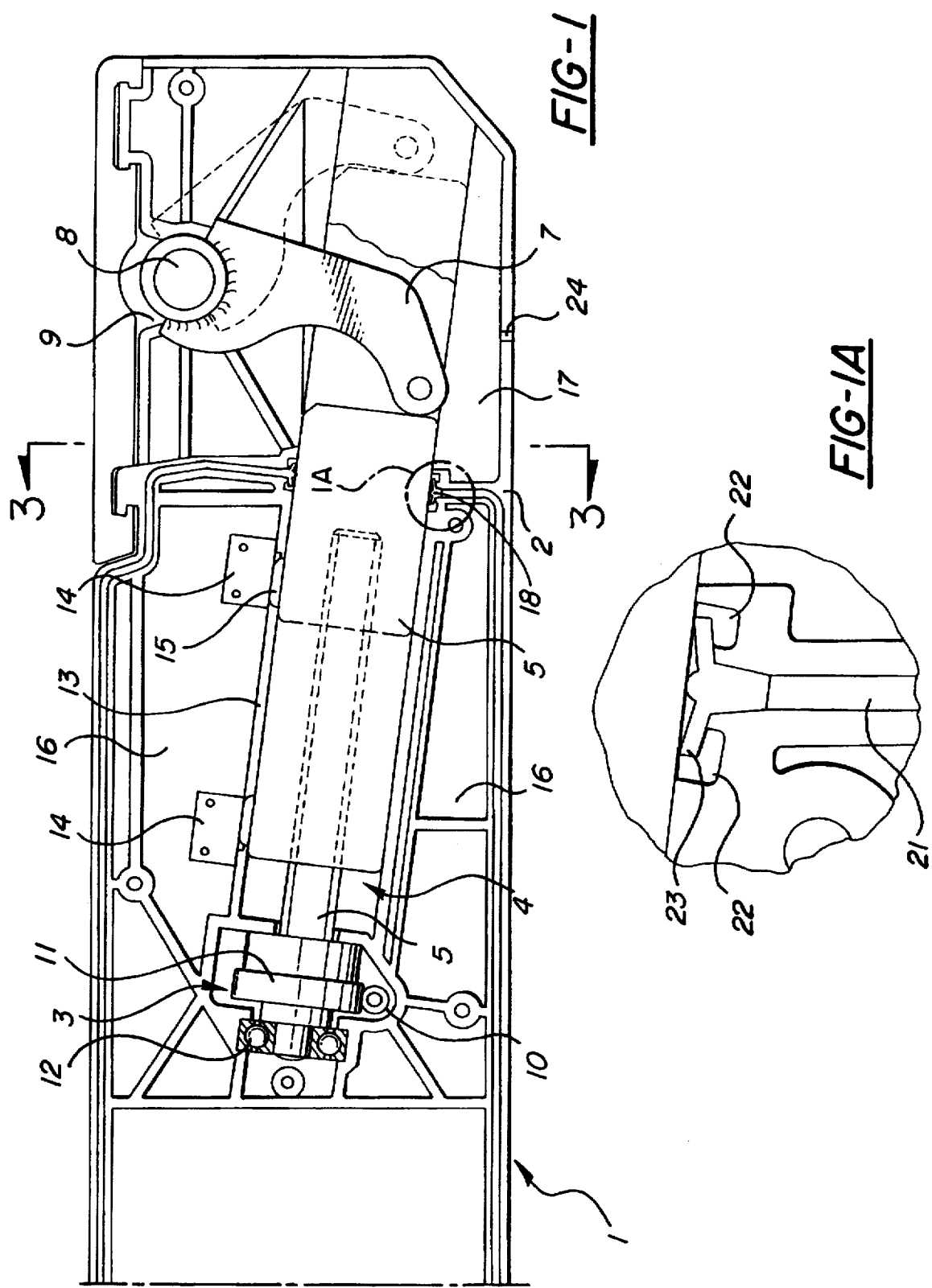
FIG. 1: A cross-section through an arrangement in accordance with the invention.
Figure 2:
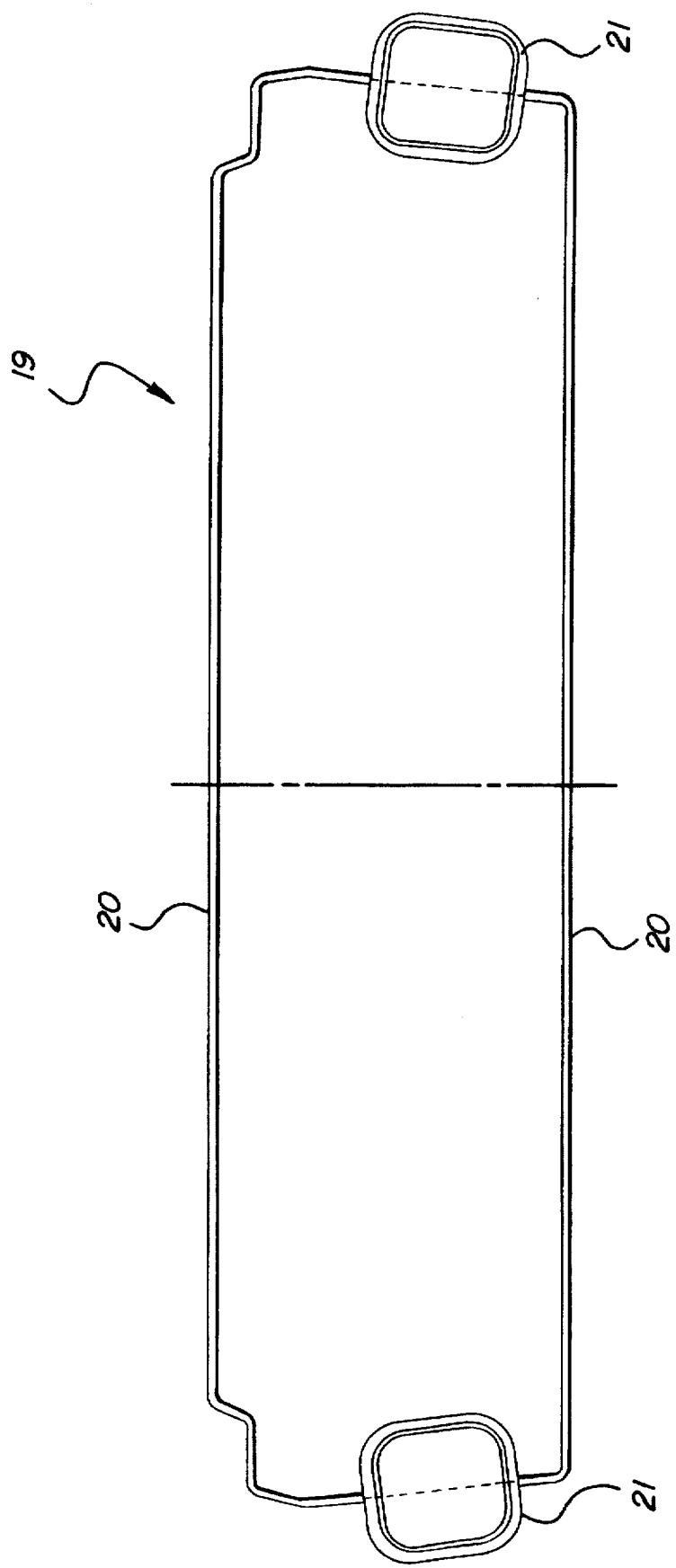
FIG. 2: A one-piece seal.
Figure 3A:
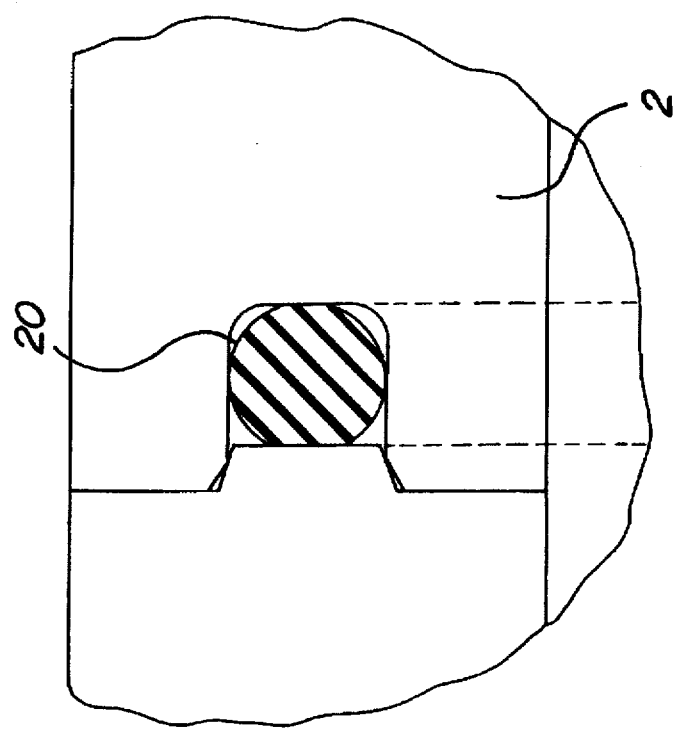
Figure 3:
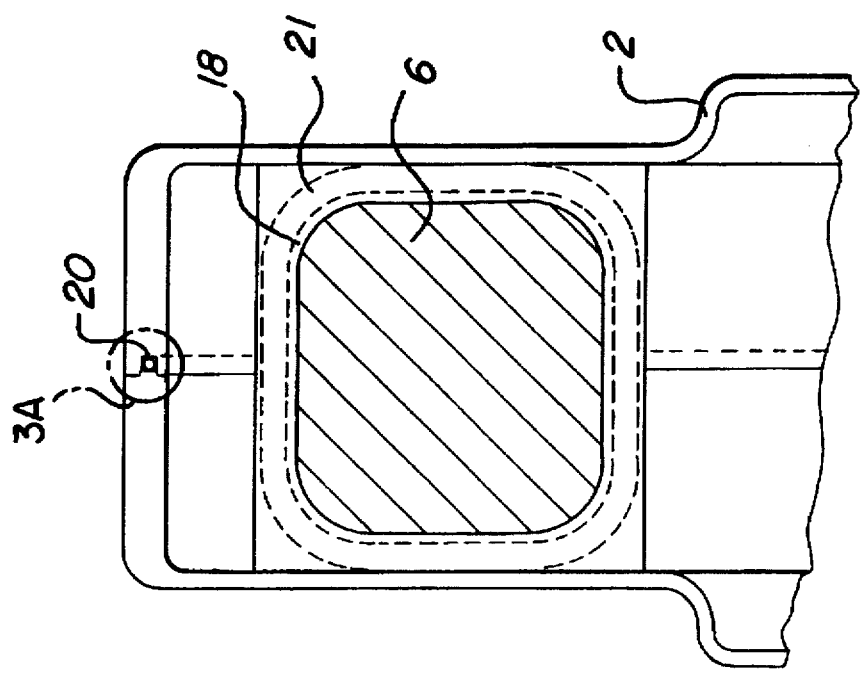

FIG. 1 shows only one side of drive 1, the other side being of mirror-symmetrical design, corresponding to the illustrated side of drive 1.

Adjusting device 4 consists of a thrust spindle 5, to which an adjusting nut is assigned, the nut being designed as sliding piece 6. Sliding piece 6 presses on lever arm 7 of an elbow lever, which is connected in non-rotating fashion to the moving part of the slatted bed base. Lever arm 7 is connected in non-rotating fashion to axle 8 of the elbow lever for this purpose. Axle 8 is connected, indirectly at least, to the non-moving parts of the slatted bed base or to the bed, so that the deflection of lever arm 7 as a result of the action of sliding piece 6 causes deflection of the elbow lever, this bringing about displacement of the moving parts of the slatted bed base.

Axle 8 is guided by recesses 9 in the housing.

Driveshaft 10 of the servomotor turns worm gear 11, which is integrally moulded on thrust spindle 5. Thrust spindle 5 is mounted in ball bearing 12. Rotation of thrust spindle 5 about its own axis causes displacement of sliding piece 6, this inducing movement of the lever arm.

Sliding piece 6 is guided in sleeve 13 for movement. Two position switches 14, actuated by sliding piece 6, are mounted on sleeve 13 for electrical control of the drive. Position switches 14 are connected to an activation circuit of the servomotor to this end.

For the purpose of actuating the switches, sliding piece 6 is provided with lug 15, which acts on the actuating elements of the position switches when sliding piece 6 moves.

Housing 2 is of two-piece design. A sealed housing section 16 and an open housing section 17 are produced by joining the two halves of the housing. The dividing wall between sealed housing section 16 and open housing section 17 is provided with a feed-through 18 for sliding piece 6. This feed-through 18 is located in the parting line of the two halves of the housing. Easy assembly is possible as sliding piece 6 does not have to be separately inserted into feed-through 18 because the parts of feed-through 18 in each half of the housing surround sliding piece 6.

Seal 19 is fitted between the two halves of the housing, thus sealing off not only the two halves of the housing against each other, but also sliding piece 6 against feed-through 18.

Seal 19 is designed as a one-piece seal and displays a first sealing element 20. Sealing element 20 is a toroidal sealing ring. The second sealing element 21, which serves to seal off sliding piece 6 against feed-through 18, is a lip seal. Sealing elements 20 and 21 lie in a single plane when not inserted, permitting simple manufacture of this seal 19. For insertion, the second sealing element 21 is rotated through 90°, this causing no deformation of the seal due to the first sealing element 20 being designed as a toroidal sealing ring.

Seal 19 is inserted into seal retainers integrated in the contact surfaces of the two halves of the housing in the form of grooves.

Two parallel annular grooves 22 are provided in the region of feed-through 18, forming a space for the sealing lips 23 to take effect.

Seal 19 seals off sealed housing section 16 against open housing section 17 and against the environment. All electrically operating drive components, such as servomotor, activation circuit and position switches 14, as well as a number of mechanical drive components, such as the linkage and the spindle-and-nut drive, are located in this sealed housing section 16. This makes it possible to expose the drive to liquids and moisture without impairing operation or safety of the drive.

In order to prevent moisture from accumulating in the open housing section, it is provided with downward-pointing drainage openings 24.

I claim:

1. Drive for adjustable parts of recliners or beds, including a chousing in which electrically operating drive components and mechanically operating drive components are located, characterised in that:

said housing is divided into a sealed housing section and an unsealed housing section;

said electrically operating drive components are located in the sealed housing section;

said mechanically movable components extend through a feed-through from the sealed housing section into the unsealed housing section; and seal means are provided for sealing said mechanically movable components against the feed-through;

said seal means being a single piece seal including a first sealing element, for sealing the housing, and an integral second sealing element, for sealing the feed-through;

said first sealing element being a toroidal sealing ring with said two sealing elements lying essentially in one plane prior to assembly so that said second sealing element can be rotated relative to said plane for assembly into the housing.

2. Drive for adjustable parts of recliners or beds according to claim 1, characterized in that:

said housing includes two halves, a seal being inserted between the two halves of the housing.

3. Drive for adjustable parts of recliners or beds according to claim 2, characterized in that:

said feed-through lies in the parting line between the two halves of the housing.

4. Drive for adjustable parts of recliners or beds according to claim 1, characterized in that said second sealing element is a lip seal.

5. Drive for adjustable parts of recliners or beds according to claim 1, characterized by:

said housing including seal retainers into which said seal means is fitted.

6. Drive for adjustable parts of recliners or beds according to claim 1, characterized by:

adjustment means including an axle and being defined by an elbow lever including one lever arm which has a working connection with said drive, while another lever arm has a working connection with the adjustable part of the recliner or bed, said housing being provided with mounts for said axle;

a sliding piece, moveable in linear fashion by a spindle-and-nut mechanism acting on the drive-side lever arm, said sliding piece being moveable through the feed-through, said seal being located between said sliding piece and the feed-through; and a spindle-and-nut mechanism driven by an electric motor, all mechanical and electrical means for moving said sliding piece being located in the sealed housing section.

7. Drive for adjustable parts of recliners or beds according to claim 6, characterized by:

a sleeve in said housing, said sliding piece being guided by said sleeve.

8. Drive for adjustable parts of recliners or beds according to claim 7, characterized by:

position switches located on said sleeve and actuated by said sliding piece.

9. Drive for adjustable parts of recliners or beds according to claim 8, characterized in that:

said position switches are located on the outside of said sleeve, and include parts which trigger the switching functions protruding into the inside of said sleeve through openings and being actuated by said sliding piece.

10. Drive for adjustable parts of recliners or beds according to claim 6, characterized by:

downward-pointing drainage openings in said unsealed housing section.

* * * * *